United States Patent [19]

Szeverenyi et al.

[11] 3,789,338

[45] Jan. 29, 1974

[54] PRESSURE SENSOR DEVICE

[75] Inventors: Nikolaus A. Szeverenyi; David F. Thompson, both of Warren, Pa.

[73] Assignee: GTE Sylvania Incorporated, Seneca Falls, N.Y.

[22] Filed: Oct. 2, 1972

[21] Appl. No.: 294,457

[52] U.S. Cl. ............. 337/3, 200/81 R, 337/77, 337/102, 337/107, 340/240
[51] Int. Cl. ............................................. H01h 37/00
[58] Field of Search ...... 340/240, 239 R; 337/3, 20, 337/77, 78, 102, 107, 376; 250/81 R

[56] References Cited
UNITED STATES PATENTS

| 3,721,933 | 3/1973 | Peroy | 337/78 X |
|---|---|---|---|
| 3,686,656 | 8/1972 | Richards | 340/240 |
| 3,629,765 | 12/1971 | Hanson | 337/107 X |
| 3,508,236 | 4/1970 | Adams | 340/240 |
| 3,370,142 | 2/1968 | Burch et al. | 337/77 |
| 2,931,011 | 3/1960 | Good | 200/81 R X |

Primary Examiner—Bernard A. Gilheany
Assistant Examiner—A. T. Grimley
Attorney, Agent, or Firm—Norman J. O'Malley; Donald R. Castle; William H. McNeill

[57] ABSTRACT

A sensor device senses the presence or absence of pressure. As the pressure about the device exceeds a pre-established level, a movable tip of the device is depressed. A thermally conductive portion of the tip thereby engages a spaced apart portion of an element. This engagement upsets the thermal properties within the device, causing two heat responsive members to disengage. A sensing apparatus is also disclosed which includes the above described device and an electrical circuit which comprises a potential source and a current indicating means. When the above mentioned heat responsive members are engaged, current in the circuit is at a sufficient level to activate the current indicating means. However, when the heat responsive members disengage, the current must pass through a resistive material, thereby lowering the level of current flow. This lower electrical current is then not sufficient to actuate the indicating means.

20 Claims, 4 Drawing Figures

PATENTED JAN 29 1974 3,789,338
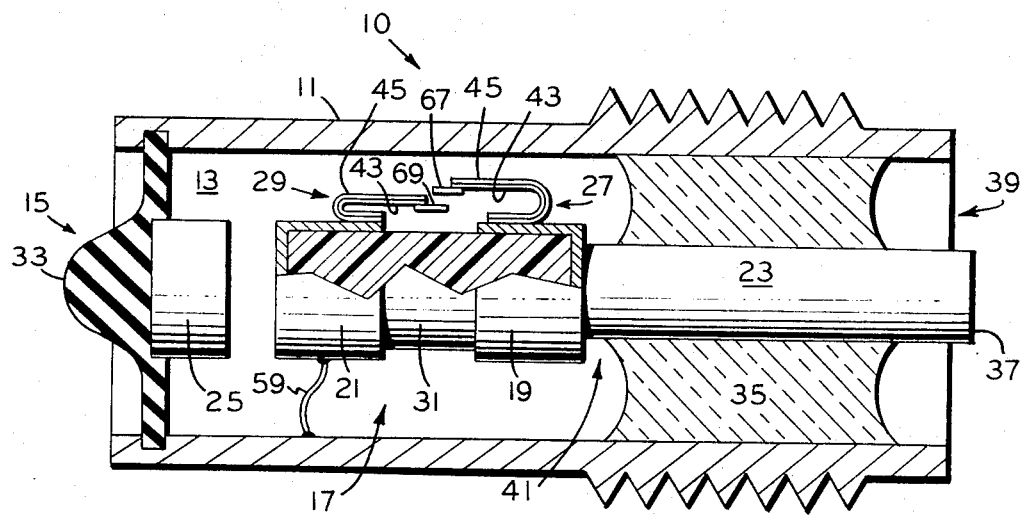
Fig. 1
Fig. 2
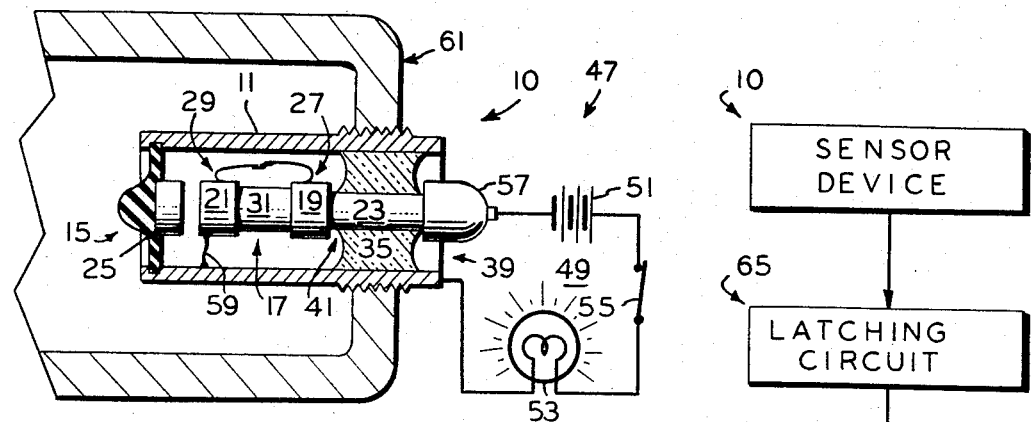
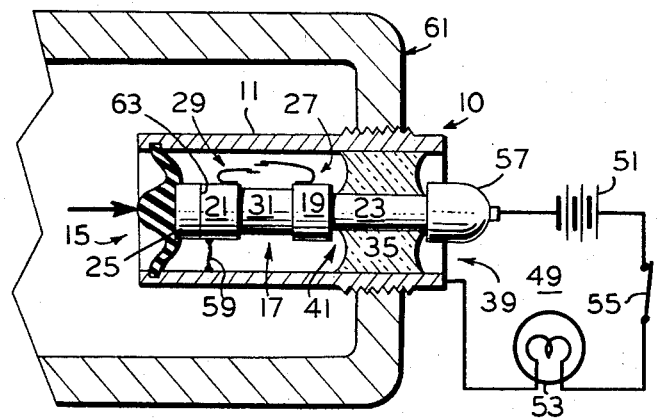
Fig. 3
Fig. 4

PRESSURE SENSOR DEVICE

BACKGROUND OF THE INVENTION

This invention relates to pressure sensing devices.

Previous known devices and apparatus for sensing pressures range from a variety of electrically operated metering units to any of several mechanically actuated indicators. Perhaps the simplest of these devices is the teapot which has a whistling mechanism in its lid or spout which is actuated when the pressure within the pot attains a certain level. Further examples include the basic electro-mechanical devices used in many automobiles for detecting the pressure of the liquids utilized in the operation of the vehicle, such as the engine oil. The latter type devices, however, have most usually required somewhat complex electrical circuitry to achieve proper operating characteristics. This, in turn, results in increased manufacturing costs for producing such devices.

It is believed, therefore, that a device for sensing the presence or absence of pressure which would be relatively simple in operation and inexpensive to manufacture would constitute an advancement in the art.

OBJECTS AND SUMMARY OF THE INVENTION

It is, therefore, a primary objective of this invention to provide a device for sensing the presence or absence of pressure.

It is a further objective of this invention to provide such a device which is relatively simple in operation and inexpensive to manufacture.

In accordance with one aspect of this invention, there is provided a sensor device for sensing the presence or absence of pressure surrounding the device. As the pressure exceeds a pre-established level, a movable tip member is depressed. A thermal conductive portion of the tip engages a spaced apart portion of an element within the device, thereby upsetting the thermal properties of the device and causing a pair of heat responsive members in the device to disengage.

In accordance with another aspect of the present invention, a sensing apparatus is provided which includes the previously described device and an electrical circuit. The circuit comprises a potential source and a current indicating means and is electrically joined to the device. Accordingly, when the heat responsive members of the device are engaged, electrical current in the circuit is sufficient to actuate the indicating means. When these members disengage, however, the level of current flow drops and the indicating means is not actuated.

BRIEF DESCRIPTION OF THE DRAWINGS

FIG. 1 is a side elevational view, partly in section, illustrating one embodiment of the sensor device of the present invention.

FIG. 2 is a side elevational view, partly in section, of one embodiment of the sensing apparatus of the present invention when the fluid pressure to be detected is below a pre-established level.

FIG. 3 is a side elevational view, partly in section, of the embodiment of FIG. 2 illustrating the relative positions of the components of the device when the fluid pressure to be detected exceeds a pre-established level.

FIG. 4 is a block diagram of a circuit employing a latching circuit.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings.

In FIG. 1, one embodiment of the present invention, sensor device 10, illustrated and shown to comprise a housing member 11 defining a chamber 13, a movable tip member 15 secured to the housing and forming a closure for chamber 13, an element 17 within the chamber and having first and second spaced apart portions 19 and 21 respectively, thermally conductive member 23, and first and second heat responsive members 27 and 29 secured respectively to first and second spaced apart portions 19 and 21 of element 17. Each of the heat responsive members 27 and 29 has a free end and are adapted for engaging when the temperature difference between spaced apart portions 19 and 21 exceeds a predetermined amount. This operation will be more adequately described with the description of FIGS. 2–4. Positioned within element 17 is a means for heating the element, illustrated as electrical resistive material 31. In the embodiment as shown, movable tip 15 is provided with a protuberated end 33 which serves as a protective means for the internal components of device 10. More specifically, the configuration for end 33 serves to restrict excessive movement of tip 15 when pressure is exerted against the tip causing it to inwardly deflect, as shown in FIG. 3.

Tip 33 is preferred by applicants to be of a flexible organic material such as rubber having a thermally conductive portion 25 inbedded partially therein. However, this is not to be construed as restrictive to the present embodiment in that tip 33 could be of substantially any flexible material, even metallic. If it were metallic, thermally conductive portion 25 could be attached thereto by such means as welding, soldering, etc., or be formed as an integral portion of the tip.

Thermally conductive member 23 is illustrated as being positioned within device 10 in such a manner so as to be electrically insulated from housing 11. To accomplish this, thermal member 23 is embedded in a suitable electrically insulative material 35 such as glass. One end, 37, of thermal member 23 is designed to have open access at the rear portion 39 of device 10 whereas opposing end 41 is adapted for having access to chamber 13 within the device. Both thermally conductive member 23 and thermally conductive portion 25 are preferred to be of a good thermal conductive material such as copper.

As illustrated, end 41 of thermal member 23 is secured in heat conductive relationship to first spaced apart portion 19 of element 17. This may be accomplished by any of the well known methods, such as welding or soldering. First and second spaced apart portions 19 and 21 of element 17 are preferred to be of a material possessing both good heat and electrically conductive properties. Two good examples of suitable materials for these portions are copper and silver, with copper being preferred because of its lower cost.

Resistive material 31, positioned between first and second portions 19 and 21, can be any of several materials currently used in electrical resistors or similar functioning devices. As previously described, material 31 is electrically resistant and functions as a means for heating element 17. This is accomplished by passing electrical current through the material causing it to increase in temperature. A more thorough description of the operation of device 10 will be given when describing FIGS. 2, 3, and 4.

First and second heat responsive members 27 and 29 are illustrated in FIG. 1 as being respectively secured to first and second spaced apart portions 19 and 21 of element 17. Applicants utilize as heat responsive members 27 and 29 a pair of opposingly aligned bimetal members having substantially similar deflection properties. More specifically, a bimetal used successfully in device 10 is Chace 2400 bimetal, manufactured by the W. M. Chace Company of Detroit, Mich., a subsidiary of the W. B. Driver Company of Newark, N.J., which itself is a subsidiary of the assignee of the proposed present invention. Chace 2400 bimetal has a high expanding side (illustrated as high expanding layer 43 in FIG. 1) consisting essentially of about 22 percent by weight nickel, 3 percent by weight chromium, with the remainder iron, and a low expanding side (illustrated as low expanding layer 45 in FIG. 1) consisting essentially of about 36 to 42 percent nickel with the remainder iron. An additional newly available bimetal found suitable for use in sensor device 10 is also produced by the W. M. Chace Company and has a high expanding side consisting essentially of about 22 percent nickel, 3 percent chromium, with the balance iron, and a low expanding side consisting essentially of about 30 to 35 percent nickel with the remainder iron.

The high expanding side of the latter bimetal has a first coefficient of thermal expansion of from 0° to 150°F of at least $7.0 \times 10^{-6}$ per °F and a second coefficient of thermal expansion lower than the first over a temperature range from 150° to 600°F. The low expanding side of the bimetal has a first coefficient of expansion ranging from about $1.4 \times 10^{-6}$ per °F over a temperature range of 0° to 150°F and a second coefficient of expansion of at least $7.0 \times 10^{-6}$ per °F over a temperature range from about 400° to 600°F. This particular bimetal reduces many of the stresses found in prior art bimetals and results in improved overall operating conditions, especially in higher temperature ranges. Depending on the configuration used for each of the bimetallic members, as well as the initial spacing between these members and the temperature difference required to cause their engaging, other bimetallic materials can be utilized successfully in this invention. For practical reasons, however, bimetallic materials having operating characteristics substantially similar to those described are preferred. To describe the operation of sensor device 10, reference is now made to FIGS. 2 and 3 wherein there is illustrated the positions of various components of device 10 during two different levels of fluid pressure. More specifically, in FIG. 2, sensing apparatus 47 is shown to include device 10 and an electrical circuit 49 comprising a potential source 51, current indicating means, illustrated as a bulb 53, and a switch 55. Upon closing switch 55, a complete electrical circuit is formed. Electrical current passes from potential source 51 through cap 57 (which may be any suitable electrical connecting device), thermal conductive member 23, first spaced apart portion 19, resistive material 31, second spaced apart portion 21, to housing 11 (which is of an electrically conductive material) via interconnecting wire 59 and back to bulb 53. This above described current flow through resistive material 31 causes the material to heat up, as is the case for most electrically resistant materials. The heat generated by the material in turn heats first and second spaced apart portions 19 and 21 of element 17. The heat within first portions 19 is heat sinked further through thermally conductive member 23 where it is still further dissipated through material 35, housing 11, and into container 61, in which sensor 10 is positioned. Some of this heat is also permitted by the design of rear portion 39 of sensor 10, to dissipate from material 35 into the external environment surrounding sensor 10.

Second spaced apart portion 21, on the other hand, does not possess the heat sinking capability of first portion 19. As can be seen, the heat in this portion is substantially contained within chamber 13, with very little being dissipated into housing 11. Therefore, second portion 21 remains substantially warmer than first portion 19. These unequal temperature values in turn cause heat responsive members 27 and 29 to engage. It is remembered that heat responsive members 27 and 29 possess substantially similar deflection properties and therefore will deflect unequally as a result of each now being connected to members having unequal temperatures. Once engaged, heat responsive members 27 and 29 now provide an electrical current path for circuit 49 which will bypass resistive material 31. As a result, the current in the circuit is substantially increased and causes bulb 53 to be lit. Assuring that bulb 53 will not light under these conditions is readily achieved by proper selection of corresponding elements in the sensor and circuit. One example of a workable circuit-sensor arrangement is to use a 12 volt potential source connected to a bulb having a resistance of approximately 1 ohm. When using this combination, the desired resistance of the resistive material of element 17 is approximately 240 ohms. The resistance of other elements in sensor 10, particularly housing 11, spaced apart portions 19 and 21, thermally conductive member 23, wire 59, and heat responsive members 27 and 29 is minimal and can be considered effectively as zero. Thus, it can be seen in FIG. 2 that when relatively low or no pressure is exerted against tip member 15, bulb 53 is lit, thereby providing a visual indication of such a condition.

When fluid pressure within container 61 reaches a pre-established level, as illustrated in FIG. 3, a new situation occurs. The application of pressure against movable tip 15 causes the tip to inwardly deflect in a direction substantially toward element 17. This inward deflection causes thermally conductive portion 25 of tip 15 to engage second spaced apart portion 21 at a common interface, illustrated as 63. This engagement now provides second portion 21 with an improved heat sinking capability. Accordingly, the heat contained within second portion 21 can now be dissipated into thermally conducting portion 25, thus, substantially lowering the temperature of portion 21. This reduction in temperature of portion 21 reduces substantially the previously described temperature difference between spaced apart portions 19 and 21. When the temperature difference falls below a predetermined level, first and second heat responsive members 27 and 29 will disengage (as shown) causing the electrical current in the circuit to once again pass through resistive material 31. Accordingly, the reduced current is now insufficient to light bulb 53. Thus, there is a ready means for indicating when appropriate pressure is within container 61, as well as when that pressure falls below a pre-established level. Referring again to FIG. 3, heat responsive members 27 and 29 will remain disengaged provided second portion 21 can dissipate heat at an appropriate rate so as to keep the temperature difference between itself and first portion 19 within the prescribed range. To assure that this will occur in the event that heat ranges within device 10 become excessive, tip member 15 can be of a good thermal conductive material such as copper. The heat within second portion 21 is then heat sinked into thermal portion 25 and then into tip 15 where it can further dissipate into the environment surrounding the tip. If it is desired to manufacture tip 15 from a metallic material as described, interconnecting wire 59 can then be secured to either thermal portion 25 of tip 15 instead of to housing 11 as shown. In this manner, second spaced apart portion 21 will still retain an electrical connection with housing 11, although indirectly.

A truly unique feature of device 10 is a delay characteristic which is inherently provided. This is achieved when the pressure exerted against second portion 21 by tip 15 is reduced sufficiently to cause disengagement of thermal portion 25 and second portion 21 at common interface 63. Once disengagement occurs, second portion 21 is deprived of the previously mentioned heat sinking capability and again increases in temperature. As can be appreciated, this increase in temperature will consume a period of time, depending on the components utilized. Using the circuit and device as described, this time period is approximately 30 seconds.

In order to provide an indication when pressure is applied to tip 15 other than deactivating bulb 53, circuit 49 can easily be modified so that bulb 53 is turned off instead of on. An example could be to utilize a switching device such as a relay or semiconductor switch which is actuated by the closure of heat responsive members 27 and 29 to turn off the bulb.

Additionally, if it is desired to provide a steady signal in order that bulb 53 is continually activated during operation, an electrical or mechanical latching circuit or device can be employed which latches on to energize bulb 53 continuously after the first engagement of heat responsive members 27 and 29. Such latching circuits or devices can include an SCR, latching relay or similar devices. An example of such an arrangement is illustrated in FIG. 4 in which the signal from sensor 10 activates latching circuit 65, which in turn provides a steady electrical signal to indicating means 53.

To assure a sound electrical connection between heat responsive members 27 and 29 when they are engaged, the free ends of each can be provided with a contacting portion 67 and 69 of a noble metal, such as gold or silver (more clearly illustrated in FIG. 1).

It is readily seen, therefore, that sensor device 10 and sensing apparatus 47 can be utilized in any of several pressure containing systems. For example, apparatus 47 could easily be incorporated into an automobile's braking system to indicate to the vehicle operator when the fluid pressure of his brakes is approaching the danger level. It is also understood that device 10 and apparatus 47 are not dependant on pressure contained within a container, as illustrated. Apparatus 47 can even be utilized as a doorbell or similar device in which depression of tip 15 could actuate a buzzer or similar warning device.

Thus, there has been provided a device and apparatus for detecting the presence or absence of pressure. A unique feature of this apparatus and device, a delay operation, is also provided.

While there has been shown and described what are at present considered the preferred embodiments of the invention, it will be obvious to those skilled in the art that various changes and modifications may be made therein without departing from the scope of the invention as defined by the appended claims.

What is claimed is:

1. A sensor device comprising:
   a housing member defining a chamber;
   an element within said chamber having first and second spaced apart portions;
   means for heating said element;
   a thermally conductive member within said chamber, said thermally conductive member being secured in heat conductive relationship to said first spaced apart portion of said element;
   a movable tip member secured to said housing and forming a closure for said chamber, said tip member having a portion thereof of thermally conductive material adapted for engaging said second spaced apart portion of said element when the pressure surrounding said tip member exceeds a pre-established level; and
   first and second heat responsive members secured to said first and second spaced apart portions respectively, said heat responsive members each having a free end adapted for engaging only when the temperature difference between said first and second spaced apart portions exceeds a predetermined level.

2. The sensor device according to claim 1 wherein said second spaced apart portion of said element is joined in an electrically conductive relationship with said housing member.

3. The sensor device according to claim 1 wherein said thermally conductive member is also electrically conductive.

4. The sensor device according to claim 1 wherein said element within said chamber is an electrical resistant element.

5. The sensor device according to claim 1 wherein said heat responsive members are bimetallic members.

6. A sensor device according to claim 5 wherein the high expanding side of said bimetallic members are alloys consisting essentially of from about 22 percent by weight nickel, about 3 percent by weight of chromium and the balance iron and the low expanding side of said bimetallic members are alloys consisting essentially of from about 36 to about 42 percent nickel and the balance iron.

7. The sensor device according to claim 5 wherein the high expanding layer of said bimetallic members is an alloy consisting essentially of about 22 percent by weight nickel, 3 percent by weight chromium, and the balance iron, and the low expanding layer is any alloy consisting essentially of about 30 to 35 percent by weight nickel and the balance iron.

8. The sensor device according to claim 7 wherein said high expanding layer of said bimetallic members has a first average coefficient of thermal expansion over a temperature range of from about 0° to 150° F of at least $7 \times 10^{-6}$ per °F, and a second coefficient of thermal expansion over the temperature range of about 150° to 600° F lower than said first average coefficient of thermal expansion, and said low expanding layer has a first average coefficient of thermal expansion over a temperature range of about 0° to 150° F of from about $1.4 \times 10^{-6}$ per °F to about $6.0 \times 10^{-6}$ per °F and a second average coefficient of thermal expansion over a temperature range of from about 400° to 600° F or above about $7.0 \times 10^{-6}$ per °F.

9. The sensor device according to claim 5 wherein each of said bimetallic members has a contacting portion of noble metal affixed thereto.

10. A sensing apparatus comprising a sensor device comprising:
   a housing member defining a chamber;
   an element within said chamber having first and second spaced apart portions;
   means for heating said element;
   a thermally conductive member within said chamber, said thermally conductive member being secured in heat conductive relationship to said first spaced apart portion of said element;
   a movable tip member secured to said housing forming a closure for said chamber, said tip member having a portion thereof of thermally conductive material adapted for engaging said second spaced apart portion of said element when the pressure surrounding said tip member exceeds a pre-established level;
   first and second heat responsive members secured to said first and second spaced apart portions respectively, said heat responsive members each having a free end adapted for engaging only when the temperature difference between said first and second spaced apart portions exceeds a predetermined level; and
   means for sensing when said heat responsive members are enagaged.

11. The sensing apparatus according to claim 10 wherein said second spaced apart portion of said element is joined in an electrically conductive relationship with said housing member.

12. A sensing apparatus according to claim 10 wherein said means for sensing when said heat responsive members are engaged is an electrical circuit comprising a source of electrical potential operatively connected to said heat responsive members for opening and closing said circuit and a current indicating means adapted for indicating electrical current in said circuit when said heat responsive members are engaged.

13. A sensing apparatus according to claim 12 wherein in said sensor device, said element within said chamber is an electrical resistant element and is operatively connected to said source of electrical potential.

14. A sensing apparatus according to claim 13 wherein in said sensor device said thermally conductive member is electrically conductive and is operatively connected to said electrical potential and to said electrical resistant element.

15. The apparatus according to claim 12 wherein said electrical circuit includes a latching means utilized to provide a steady electrical signal from said sensor device to said current indicating means.

16. A sensing apparatus according to claim 10 wherein in said sensor device said heat responsive members are bimetallic members.

17. A sensor device according to claim 16 wherein the high expanding side of said bimetallic members are alloys consisting essentially of from about 22 percent by weight nickel, about 3 percent by weight of chromium and the balance iron and the low expanding side of said bimetallic members are alloys consisting essentially of from about 36 to about 42 percent nickel and the balance iron.

18. The apparatus according to claim 16 wherein the high expanding layer of each of said bimetallic members is an alloy consisting essentially of about 22 percent by weight nickel, 3 percent by weight chromium, and balance iron, and the low expanding layer is an alloy consisting essentially of about 30 to 35 percent by weight nickel and the balance iron.

19. The apparatus according to claim 18 wherein said high expanding layer of said bimetallic members has a first average coefficient of thermal expansion over a temperature range of from about 0° to 150° F of at least $7 \times 10^{-6}$ per °F and a second coefficient of thermal expansion over the temperature range of about 150° to 600° F lower than said first average coefficient of thermal expansion, and said low expanding layer has a first average coefficient of thermal expansion over a temperature range of about 0° to 150° F of from about $1.4 \times 10^{-6}$ per °F to about $6.0 \times 10^{-6}$ per °F and a second average coefficient of thermal expansion over a temperature range of from about 400° to 600° F or above about $7.0 \times 10^{-6}$ per °F.

20. The apparatus according to claim 16 wherein each of said first and second bimetallic members has a contacting portion of noble metal affixed thereto.

* * * * *